Nov. 26, 1957  F. B. T. SIEMS  2,814,117
MARKING INSTRUMENTS
Filed April 19, 1954
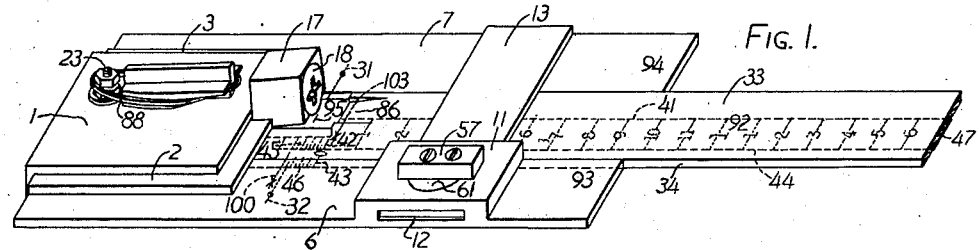
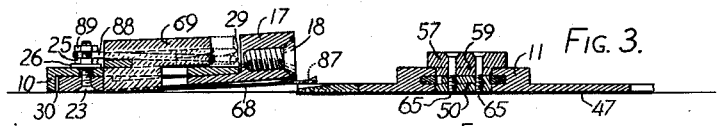
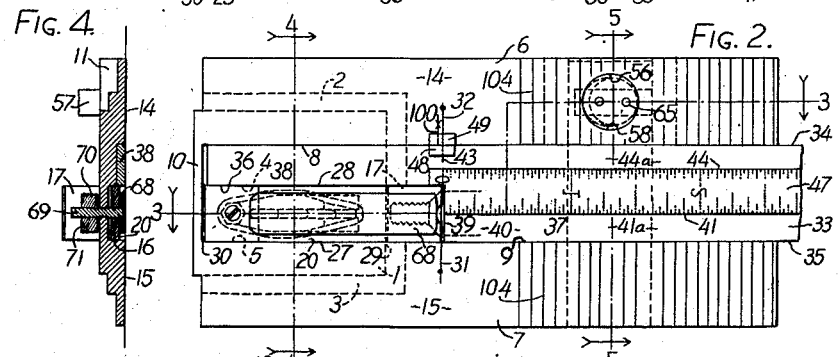
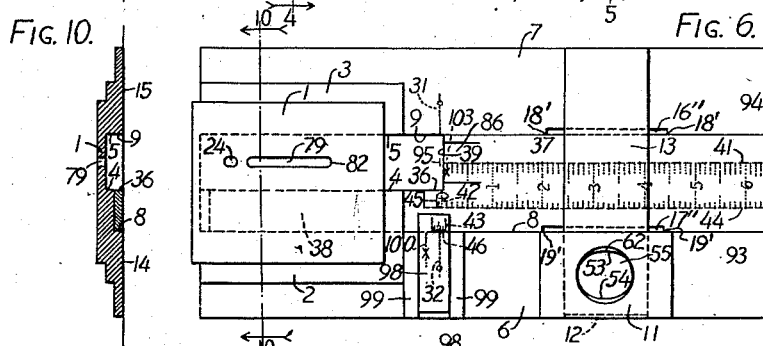
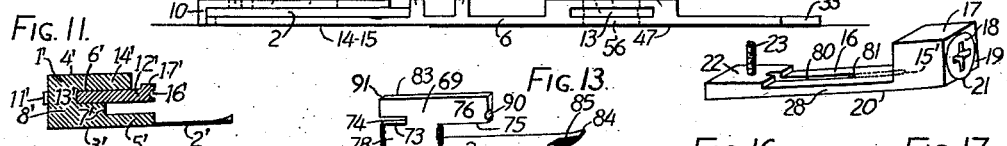
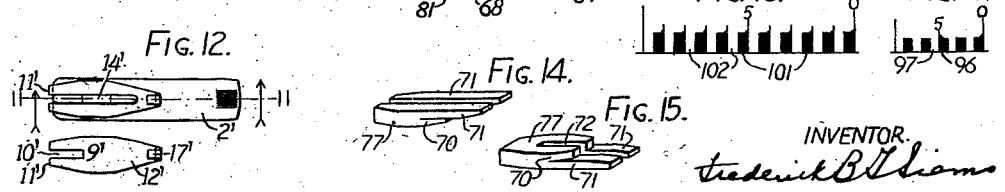
INVENTOR.
Frederick B. T. Siems United States Patent Office 2,814,117
Patented Nov. 26, 1957

2,814,117

MARKING INSTRUMENTS

Frederick B. T. Siems, Baltimore, Md.

Application April 19, 1954, Serial No. 423,877

9 Claims. (Cl. 33—34)

The invention relates to improvements in marking instruments in which a marker is slidably combined—and aligned—with a principal scale; said scale, when of a linear unit of division of the order of $\frac{3}{32}$-inch or more, being supplemented by another scale of fractional or decimal divisions of such unit to indicate the distance obtaining between the marker and the zero position of the principal scale.

In the present improved marking instrument, the framework supporting the marker also embodies a receptacle for a scale-plate. The receptacle is provided with a cam-unit which when rotated in one direction causes the receptacle to be tightened about the lateral sides of the scale-plate to securely clasp the latter in a required position; then in rotating the cam-unit in the other direction to appropriate rotary positions, the scale-plate may be made to slide to-and-fro along the embracing sides of the receptacle with any required degree of freeness, or it may be freely removed therefrom.

As a second improvement, the marking implement in pre-marking position is elevated sufficiently to allow the initial end-portion of the scale-plate to be slidably brought under the marking implement and to allow an inking-strip to be interposed between them. It will be shown that by this simple innovation, a distance however small may be marked off from a given position on a drafting surface and unrestricted use of the inking-strip is provided.

As a third improvement, the area of the principal scale processed on the under-surface of a transparent scale-plate, is coated with a band of plastic paint which is opaque and of a color in direct contrast to that of the markings of the scale. Thus, a graduation of the scale viewed through the transparent plate, is seen distinctly against the coating which serves as a background as well as a mask over a drawing; and definite visual registry of the terminal of the graduation at the border of said band with a line on the drawing is assured despite any similarity of color between the graduation and the line. Furthermore, the scale is shielded by the coating and always presents a clean appearance; and the plate portion adjacent to the scale, through which portion the drawing line or position is viewed, is guarded by virtue of the nearness of the coating against a scuffing contact with the drawing.

As a fourth improvement, the supplemental scale of fractional divisions is processed also on the under-side of the scale-plate and along a lateral edge thereof, its zero graduation being an offset zero graduation of the principal scale. By thus consolidating the two scales, an adjustable part as a correlating means in the instrument is avoided. The two scales although offset from one another have a continuity of graduations that will permit during one operation the machine engraving and spacing of their parallel division lines on a glass negative used in connection with a photo-contact-printing and staining process for reproducing the graduations on a vinylite plastic surface.

As a fifth improvement, the decimal, supplemental scale of a scale plate intended for cartographic or other classes of precision drafting, is divided alternately into blocks and spaces of the order of 0.1 millimeter in width. A magnifier on the instrument is provided to aid in reading the scale. It has been found eminently practicable to clearly and accurately reproduce the small markings of such scale by the said photo-contact-printing and staining process.

The objects of the aforesaid improvements are: first, to provide a combined marker-support and scale-plate receptacle in a marking instrument which by an interchange of scale plates is adapted, to meet the requirement of the higher order of accuracy used in cartographic drafting, or to meet more easily the lesser requirement of accuracy used in ordinary drafting.

Second, to expedite and facilitate the marking procedure to extents which compare favorably to the time and effort involved in using a separate marker and scale with the care exercised in ordinary drafting, considering that an immediate assurance of a required accuracy is had with the instrument which cannot be attained with certainty in a first attempt to the use of the separate marker and scale;

Third, to provide a simple marking instrument for ordinary drafting practise, that is, an instrument that can be sold at a sufficiently low price to reach this market;

Fourth, to provide a simple receptable in the marking instrument for receiving one of any number of differently graduated scale plates of simple, similar form;

Fifth, to devise a cam arrangement whereby the receptacle may be made to firmly clamp the scale-plate about its lateral sides or to slidably contact them, thereby making possible the simplification of the scale plate and receptacle, and in turn allow a free and immediate removal or reception of the scale plate;

Sixth, to provide a distinguishing means for visually registering a graduation terminating within the bounds of the under-surface of a transparent plate with a line on a drafting surface;

Seventh, to avoid the use of an adjustable part in the instrument and simplify the reproduction of the scales of the scale plate by consolidating said scales; and Eighth, to permit by means of a simple innovation, a procedure for marking off extremely small distances.

For the attainment of these objects and such other objects as may appear or pointed out herein there is shown an embodiment of the invention in the accompanying drawing wherein:

Fig. 1 is a view in perspective of the entire instrument with an outer end-portion of the scale-plate broken away;

Fig. 2 is a bottom plan view of the entire instrument with an outer end-portion of the scale-plate broken away;

Fig. 3 is a longitudinal vertical section taken generally along the line 3—3 of Fig. 2;

Fig. 4 is a transverse vertical section taken along the line 4—4 of Fig. 2;

Fig. 5 is a transverse vertical section taken along the line 5—5 of Fig. 2;

Fig. 6 is a top plan view of the instrument as it appears after removal of the cam-unit, the marking-arm and the inking device;

Fig. 7 is a side view of two separated parts comprising the cam-unit;

Fig. 8 is a view in perspective of the marking arm;

Fig. 9 is a side view of the instrument as it appears after removal of the cam-unit, the marking-arm and the inking device;

Fig. 10 is a transverse vertical section taken along the line 10—10 of Fig. 6;

Fig. 11 is a longitudinal vertical section of an alternate inking device taken along the line 11—11 of Fig. 12;

Fig. 12 is a top plan view of said alternate inking device and a removable part thereof;

Fig. 13 is a view in perspective of the inking device shown in place in Figs. 1 to 4, and as it appears after removal of a removable part thereof;

Figs. 14 and 15 are views in perspective of the said removable part of the inking device of Fig. 13; and Figs. 16 and 17 are enlarged plan views of schemes of delineating small scale divisions.

The instrument is made preferably of transparent plastic material and constituting its framework of acrylic plastic are: the top plate 1 cemented flatwise to the middle-plates 2 and 3 with their flat surfaces in coplanar relation and their inner vertical sides 4 and 5 in parallel and spaced relation; the middle-plates 2 and 3 in turn cemented flatwise respectively to the elongated base-plates 6 and 7 with their flat surfaces in coplanar relation and their inner vertical sides 8 and 9 in parallel and spaced relation and the inner side 9 of base-plate 7 in coplanar flush relation with the inner side 5 of the middle plate 3; all the said plates further cemented endwise to the end-plate 10; the inverted channel plate 11 cemented to the upper surface of base-plate 6 to form the rectangular slot 12 extending transversely of said base plate 6; and, the transverse rectangular plate 13, one end-portion of which is adapted to and in slidable contact with the four sides of the slot 12, while the other end-portion of plate 13 is cemented flatwise to the upper surface of base-plate 7. When the instrument is applied to a drafting surface, the lower sides 14 and 15 of the base-plates 6 and 7 are substantially in resting contact with the said drafting surface.

The marking-arm (Fig. 8) secured at one end to the said instrument framework, remains free to be flexed and bring its other end to mark a said applied-to drafting surface. The marking-arm is plate-like for a medial length-portion 16; it is upwardly, rectangularly enlarged at its free end-portion 17 into which the flat-head screw 18 of tempered steel is threaded home longitudinally of the marking-arm and inwardly from its outer face 19. A sharpened rim-section of the head of the screw 18 of tempered steel projects below the underside 20 of the marking-arm to form the arcuate marking edge 21. The secured end-portion of the marking-arm is upwardly enlarged to the inclined face 22 from which the screw-bolt 23 rises perpendicularly and passes through the elongated hole 24 of the top plate 1 to engage the nut 25 which when turned to bear appropriately on the washer 26 and top-plate 1 secures the marking-arm in place.

When the marking-arm is thus secured, the following takes place: first, the inclined face 22 is brought in bearing contact with the top-plate 1, and since the inclination of said face 22 is approximately toward the marking edge 21, a part of the plate portion 16 also bears against the top-plate 1, thereby slightly flexing the marking arm in its secured position; second, the lateral sides 27 and 28 of the marking arm for the main part contact respectively the flush inner sides 5 and 9 of the middle-plate 3 and base-plate 7 on the one hand and the inner side 4 of the middle-plate 2 on the other, the said inner sides serving as guides for vertically flexing the marking arm; third, the block enlargement 17 is positioned beyond and extends above top-plate 1, and a clearance 29 is had between the two; fourth, a clearance is had between the secured end of the marking-arm and the end-plate 10; and, fifth, the marking edge 21 is held in pre-marking position at an appropriate level above a said applied-to drafting surface, the entire underside 20 of the marking arm also being in space relation with said drafting surface. The marking-edge 21 reaches a marking position in contact with said drafting surface upon manually depressing the block 17; upon the release of this pressure, the marking arm springs back against the top-plate 1 and the marking-edge resumes its pre-marking position.

A longitudinal adjustment of the marking-arm is permitted by virtue of the elongated hole 24 and the clearances 29 and 30; and by said adjustment, the marking-edge 21 in marking position is brought in precise alignment with the aligned reference lines 31 and 32 inscribed on the under-surfaces 15 and 14 of the base-plates 7 and 6 and extending perpendicularly to their inner sides 9 and 8.

The scale-plate 33 is of a little lesser depth than the depth of the base-plates 6 and 7, it has one continuous lateral side 34 paralleling its opposing lateral sides 35 and 36 which extend respectively along a main length-portion 37 of the scale-plate 33 and along a prolongation 38 of lesser width than the said main portion 37. The said lateral sides 35 and 36 are met by the transverse side 39 of scale-plate 33.

A scale-plate 33 is adapted to and in free slidable contact with the inner sides 8 and 9 of the base-plates 6 and 7 and the side 28 of the marking-arm secured in place; in other words, when the instrument framework and scale-plate 33 are resting on a drafting surface, the prolongation 38 is contained between the marking-arm and base-plate 6, while the main length portion 37 of scale plate 33 is contained between the two base-plates 6 and 7. In holding either the scale-plate or framework in position on the drafting surface, the other may be made to travel to and fro longitudinally of the scale-plate 33 on said drafting surface and along the said contacted sides. The scale-plate 33 reaches its inner limit of said travel when the end of the prolongation 38 abuts the end-plate 10, at which time the transverse side 39 assumes a position inside the marking-edge 21.

The principal scale 41 is processed on the underside 40 of scale-plate 33 and parallels the continuous side 34, it is in general alignment with the lowest point of the marking edge 21 in marking position. The initial end of principal scale 41 is slightly encroached upon by the transverse side 39 in order that the marking edge 21 on occasion, may occupy the position of a non-existent zero graduation of scale 41. The zero graduation 42 of the measuring scale 44 and the off-set zero graduation 43 terminating at the continuous side 34 are on the under-surface of the prolongation 38 and in a line passing through the said non-existent zero graduation, said line being perpendicular to the continuous side 34. Said measuring scale 44 and principal scale 41 are parallel to one another, and they are equivalently graduated medially along the main length portion 37 of scale plate 33. Some of the scale-plates 33 are provided with supplemental scales 45 and 46 which are on the under-surface of the prolongation 38 of the scale-plate 33 and have their zero graduations in common respectively with the zero graduation 42 of measuring scale 44 and with the off-set zero graduation 43.

The various scale-plates 33 are individually received in the instrument framework, and when the off-set zero graduation 43 in each case is brought in alignment with the reference line 32 as in Fig. 2, the marking edge 21 in marking position assumes the zero position of scale 41; or otherwise, the said reference line 32 as an index line cooperating with supplemental scale 46, will indicate thereon the distance obtaining between the said zero position of scale 41 and the marking position of the marking edge 21.

The band coating 47 of white plastic paint is applied to the area of the scales 41, 44 and 45 to distinguish their markings particularly the lines forming the graduations of the scales which are in black. Stained processed markings are primed with a neutral white paint to avoid a running mixture of the stain and the plastic paint. As a distinguishing means there is available also a process of separately staining the said markings black and the remainder of said scale area adjacent to said markings yellow, in that case the scales 41, 44 and 45 should be covered with a protective adhesive band. The borders 41 and 44 of the band coating 47 coincide with lines passing through the terminals of the graduations of scales 41, 44 and 45. Coatings 49 and 48 similar to the coating 47 may be applied to the areas of the index line 32 and supplemental scale 46 at the continuous side 34 of the scale-plate 33. The principal purpose of the coating 47 is to provide a contrasting background for the graduations of scales 41, 44 and 45 viewed through the transparent scale-plate 33, a line constituting a said graduation, without the said coating, becoming indiscernable when superimposed on a heavier drafting line of the same color. The coating 47 also protects the said scale area against smudge, scratches, etc., and in this respect, the location of the said scale area, which is removed from the edges of the scale-plate 33, in itself affords protection against damage. The coating 47 is of a thickness that will prevent a scuffing contact of the bordering, uncoated, scale-plate areas 44a and 41a with a drafting surface, and also allow the scales 41, 44 and 45 to be brought in close adjacency with said drafting surface and thereby incur but little possibility of parallax error in visibly registering a graduation with a drafting position.

The cam-part 50 of the cam-unit shown in Fig. 7 of the drawing, is composed of two cylindrical disks 51 and 52 of small diameter difference cemented together flatwise in eccentric relation, the eccentric distance between the central vertical axes of said disks being comparatively small with respect to either said diameter. The smaller, upper disk 51 of a depth equivalent to that of the transverse plate 13, is adapted to and journaled in the space between the two short straight sides 53 and 54 of the elongated opening 55 in said transverse plate 13 and extending transversely thereof. The lower, larger disk 52 is adapted to and journaled in the cylindrical opening 56 in the base-plate 6.

When the projecting base-plates 6 and 7 are left undisturbed in their relative normal position, the elongated opening 55 of the transverse plate 13 and the cylindrical opening 56 of the base-plate 6 are centrally in vertical alignment; and then upon insertion therein of the cam-part 50, the smaller disk 51 assumes an extreme right or left position in the elongated opening 55. In other words, the cam-part 50 when in the said right or left position occasions no change in the normal width of the opening between the base plates 6 and 7, and accordingly the cam-part 50 is said to be in neutral position.

Assuming for the time being that the scale plate 33 is removed from the instrument framework, then in rotating the cam-part 50 ninety degrees in either direction from a said neutral position, the smaller disk 51 is moved relative to base plate 6 in an arc of a circle the radius of which is equal to the said eccentric distance. The said circular movement is converted into a rectilinear movement (relative to base-plate 6) of the transverse plate 13 in the slot 12, at the expense of springing the base-plates 6 and 7 at the transverse plate 13 away or toward each other in the amount of the said eccentricity. The said circular movement is converted also into a rectilinear movement (relative to transverse plate 13) of disk 51 in the elongated opening 55; the said disk 51 traveling along and bearing upon one or the other of the two short sides 53, 54 in reacting against the said springing of base-plates 6 and 7, and at the same time, turning ninety degrees about its own axis thereby increasing the friction along a side 53 or 54 and occasioning a transverse thrust on the transverse plate 13 which is opposed by one or the other of the lateral sides of slot 12.

Considering now that the scale-plate 33 is in place and that the cam-part 50 is in a neutral position with the smaller disk 51 on the right hand as shown in Figs. 2 and 3, a clockwise rotation of the cam-part 50 (viewed top-wise) then will cause the inner sides 8 and 9 of the base-plates 6 and 7 to move inwardly and bear against the lateral sides 34 and 35 of the scale-plate 33 with a transmitted force several times greater than the applied force at the handle-bar 57 which is the means for rotating the entire cam-unit and is referred to hereinafter. A counter-clockwise instead of a preferred clockwise rotation of the cam-part 50 from its other neutral position, would be required to move the projecting base-plates inwardly. It may therefore be desirable to cement an obstruction to the left-hand side of the elongated opening 55 to restrict the operation of the cam-part 50 to the right-hand part of said elongated opening 55.

The eccentricity between the disks 51 and 52 is of an amount that will suffice in bringing the base-plates 6 and 7 to bear laterally on a scale-plate 33 and securely clamp the latter, by a rotation of forty-five degrees or less of the cam-part 50 from its neutral position; the scale plate 33 being one of any number of them that do not vary unduly in width from the normal width of the opening between the base-plates 6 and 7. The ratio of the transmitted clamping force with respect to an applied force at the handle-bar 57, during a said forty-five-degree clockwise rotation of the cam-part 50 from its right-hand neutral position, is approximately equivalent to the ratio of half the length of the handle-bar 57 with respect to the small eccentric distance. Transmitted forces equivalent to the clamping force are exerted also, by the smaller disk 51 against the side 54 of the elongated opening 55, and reactively by the larger disk 52 against the inner half 58 of the cylindrical opening 56 in the base-plate 6; the said two forces acting in reverse are practically diametrically opposed in view of the comparatively small eccentric distance, and they hold the cam-part 50 in clamping position against rotary slippage.

The width of the opening between the base-plates 6 and 7 may be altered and maintained by the cam-part 50 to allow the scale-plate 33 to slide along the inner side 8 of the base plate 6 with any degree of freeness desired. The base-plates 6 and 7 are maintained in position, since an extraneous force against either of them would immediately set up circumferential frictional resistance in the cam-part 50 directly proportional to the said force, the said frictional resistance nullifying the said force tending with an inappreciable moment (in the amount of the eccentricity) to turn the cam-part from its set position.

The control part 59 of the cam unit (Fig. 7) includes the handle bar 57 and the cylindrical disk 60. The said bar 57 extends across the upper circular surface 61 of said disk 60 diametrically thereof and is cemented flatwise thereto. The control part 59 may be made of one piece of material. The disk 60 of a width corresponding to that of the inverted channel plate 11, is adapted to and journaled in the cylindrical opening 62 in said channel plate 11, the said opening 62 being centrally in vertical alignment with the cylindrical opening 56 of base plate 6.

The control part 59 in place (its disk 60 received in the opening 62) is detachably attached to the inserted cam part 50. When the two said parts 59 and 50 are in their attachable positions, the handle bar 57 parallels the direction of the eccentricity between disks 51 and 52, and the drill holes 63, 63 bored through the control part 59 for passage of the screws 64, 64, are aligned respectively with the threaded holes 65, 65 for engaging the screws 64, 64. The latter when driven to bring the lower surface 66 of part 59 in bearing contact with the upper surface 67 of part 50, secure the said parts together. The handle bar 57 for rotating the cam unit, also functions as an indicator; the neutral position of said unit being indicated when the bar 57 parallels base plate 6.

The cam function of the cam-part 50 is left unchanged by the addition thereto of the control-part 59, since the upper and lower disks 60 and 52 have the same axis of rotation. The additional disk 60, otherwise, brings about a steadying effect and an increase in frictional resistance against disturbing the position of the cam unit by an extraneous force. The cam unit is vertically entrapped in place by the transverse plate 13, parts of which (adjacent to sides 53 and 54 of the elongated opening 55) being contactedly engaged between projecting parts of the upper and lower disks 60 and 52. The projecting end-portions of the handle bar 57 are in contact with the channel plate 11 as well. Shims may be placed between the attached surfaces 66 and 67, or said surfaces may be sand-papered, if necessary, to effect all of the said contacts.

The inking device comprises the inking strip 68 cemented to the base of the vertical plate 69, and the removable horizontal plate 70 re-inforced lengthwise by the pieces 71, 71 cemented to the upper surface of said plate 70 along either edge of its end-opening 72. The reinforced horizontal piece composed of the parts 70 and 71 may be made of one piece of material. The lower surface 73 of the rectangular notch 74 in the vertical plate 69, and the lower surface 75 of the longitudinal extension 76 of the same plate 69, are in alignment. The notch 74 is adapted to and snugly receives the reinforced plate 70 beyond its opening 72, and the latter opening 72 is adapted to and snugly receives the vertical plate 69 beyond said notch 74 at the same time; whereby the said plates 70 and 69 are combined frictionally and rigidly together with their lower surfaces 75 and 77 in coplanar relation.

Upon effecting the said combination of plates 70 and 69 after the vertical plate 69 is first entered in place in the instrument, the following takes place: the coplanar surfaces 75 and 77 are in resting contact with top-plate 1; the vertical-plate portion 78 below the reinforced plate 70 is slidably in contact with the sides of the vertically aligned slots 79 and 80 which are formed in the top-plate 1 and marking arm respectively and extend longitudinally of said arm; the vertical plate 69 projects below the marking arm to provide a slight clearance between the said arm in depressed position and the secured end portion 81 of the inking strip 68; and the free length of the inking strip 68 is in close adjacency with the marking arm and above the level of the under-surfaces 14 and 15 of the base plates 6 and 7.

The longitudinal extent of the vertical-plate portion 78 being less than the length of the slots 79 and 80 permits a forward and rearward travel of the combined plates 69 and 70, respectively toward and away from the marking edge 21; the extent of said travel being equivalent to the difference between the said lengths.

The vertical plate 69 and the strip 68 secured to it, are brought in place in the instrument by entering the end portion of the extension 76 through the slots 80 and 79 near their forward ends 81 and 82, while allowing the top edge 83 of plate 69 to slide along the lower rear-end of slot 80, the inking strip 68, in the meantime, being flexed against the marking arm. Upon clearing the upper forward-end 82 of slot 79, the extension 76 is slid along said end 82 to allow the vertical-plate portion 78 finally to be contained in the slots 79 and 80 and the extension 76 to overlie the top-plate 1. The inking strip undergoes a considerable amount of bending during the said entry, and is made of Celluloid rather than acrylic plastic, the latter being too brittle in strip form; the vertical plate 69 is made also of Celluloid so that the two may be cemented together with acetone or some other effective solvent.

With the marking device brought to its extreme rear position, the inking strip 68 assumes a position immediately rearward of the marking edge 21, and the upwardly bent corners 84, 84 of the strip 68 touch the marking arm. In moving the said device forward from its rear position, the inked portion 85 of the inking strip 68, being held away from the marking arm by the bent corners 84, 84, will pass under the marking edge 21 with little or no scraping contact therewith. The said bending also provides a stiffening effect against a sagging or downward curling of the inking strip 68.

The surface portion of the inking strip 68 that is brought opposite the marking edge 21 during the longitudinal travel of the marking device, is scored with a multiplicity of fine, closely-spaced grooves 85 for retaining minute streams of blue, metal-stamping ink. The grooves 85 extend longitudinally of the strip 68 and terminate close to—rather than at the very end of—the strip 68, so as to prevent ink from reaching the underside thereof.

A scale-plate portion 86 adjacent to the transverse side 39, is hollowed out from the top to provide appropriate clearance on occasion between said portion 86 and the inking strip 68 in its forward position 87 as seen outlined by a series of dots in Fig. 3 of the drawing.

The inking device is held in the extreme rear position and will automatically return thereto by a pulling action of the rubber-band 88 stretched and looped about the bolt 23 and the combined plates 69 and 70 of the inking device; one end of the loop being lodged between nuts 25 and 89 locked and held apart by a small washer not shown in the drawing, the other end of the loop being lodged in the notch 90 formed in the end of the extension 76 and positioned below the reinforcing pieces 71, 71. The said notch 90 being slightly lower in elevation than said small washer, causes the extension 76 to be tilted away from its resting position, by the rubber band 88, and the free portion of the inking strip 68 to bear against the marking arm.

To ink-prime the marking edge 21, the inking device is pushed forward at its upper rear end 91 to bring the ink-portion 85 of the strip 68 under said marking edge 21; the said device is held in this position against the tension of the rubber band 88, and the marking arm is pressed down at the block 17 to bring the marking edge 21 against a number of the ink-contained grooves 85 of the inking strip 68 and the said strip in light bearing contact with an applied-to drafting surface, or with the scale-plate portion 86, or with both of them—thereby supplying the marking edge 21 with a minute quantity of ink for one or two markings. The long beveled edge 39 of said plate portion 86, prevents an abrupt shearing action on the part of the marking edge 21 and the beveled edge 39 when they on occasion are spaced apart, and the inking strip 68 on the same occasion is in said bearing contact with both the drafting surface and plate-portion 86. Upon withdrawing the said applied holding and pressing forces, the inking device returns to its extreme rearward position, and the marking arm returns to its premarking position.

To set and clamp the scale-plate 33 in the instrument framework in a related position therewith: allow the said framework and scale-plate 33 in place therein, to rest on a drafting surface, with the handle-bar 57 in neutral position or thereabouts; hold the scale-plate portion 92 (the portion beyond the framework) against the drafting surface with the last three fingers of one hand, and keep the base-plate end-portion 93 against the continuous side 34 of the scale plate 33 with the forefinger of said hand; slide the said framework on the drafting surface and along the said continuous side 34 with the second hand, and thereby bring the index line 32 in alignment with the off-set zero graduation 43 or opposite a reading on supplemental scale 46 whichever may be required to establish the position of the marking edge 21 in relation to the zero position of the principal scale 41; bear down on the base-plate end-portion 93 with said forefinger to retain said alignment or reading and turn the handle bar 57 with the second hand to clamp the scale-plate 33 and framework together.

The instrument, by the use of both hands, may be lifted from the drafting table without likelihood of disturbing the longitudinal relation between the scale-plate 33 and the instrument framework when the two are clamped together. A vertical displacement of scale-plate 33, incurred at the outer scale-plate ends 93 and 94, would be rectified upon resumption of use of the instrument on a drafting table. In that respect, any minor deficiency in the required coplanar relation of the lower surfaces 40, 14 and 15 of the scale-plate 33 and base-plates 6 and 7, would be corrected by pressing one or the other of said plates against the drafting table, and this would not alter the said longitudinal relation.

To mark off a given distance from a given position on a drafting surface, the instrument being set and clamped and the given distance established between the marking position of the marking edge 21 and a graduation of principal scale 41, the following procedure is recommended: maneuver the instrument on the drafting surface with one hand on the scale-plate portion beyond the base plates 6 and 7 and the second hand on the marking end of the instrument—keeping the block 17 within reach of a finger of the second hand; upon registering the said drafting position with the said graduation, press the block 17 with said finger to impress the drafting surface with a fine, short, faint blue line 95, the middle point of which is nearest to and at the given distance from the drafting position.

With the use of a scale and separate marker, a pencil kept sharpened or a steel pointer easily damaged must be kept at hand. The scale generally must be held with only one hand while the other is engaged with the marking—in some cases the hands are obliged to cross each other—as a consequence, the scale is liable to slip. Except for small distances marked off, the position of the eye must be shifted to avoid parallax in vertically viewing first, a graduation of the scale for registry with a drafting position and second, a marker for positioning it opposite a second graduation of the scale. In marking opposite the edge of a scale or in transferring distances therefrom with dividers, the scale markings are subjected to damage.

Scale plates 33 when not provided with supplemental scale 46 of fractional parts of the unit of graduation of principal scale 41 have the fractional markings along the length of said scale 41. This type of scale plate is intended only for ordinary drafting. A distance to be marked off with the use of this type of scale, would obtain between the marking position of marking edge 21 on the one hand—said position on every occasion of marking assuming the zero position of scale 41—and a graduation—or an interpolated position among the graduations—of scale 41 on the other. A saving of time is had in not being required to set the scale plate on each occasion of marking; however, it is visually taxing to retain the identity of a graduation or an interpolated position among closely spaced graduations when the eye is required to be shifted to effect alternately a directional orientation of the instrument and a registry of the scale position with a drafting position.

In general, scale plates 33 should be provided with supplemental scale 45, and fractional markings should be omitted along measuring scale 44.

In scale plates 33 provided with supplemental scale 46, the fractional or decimal part contained in a given distance to be marked off, obtains between the marking position of the marking edge 21 and the zero position of the principal scale 41, and the whole-unit remainder of the given distance corresponds to a reading of one of the graduations of said scale 41. These graduations on scale plates for ordinary drafting are spaced apart: ³⁄₃₂″, ⅛″, ³⁄₁₆″, ¼″, ⅜″, ½″ or ¾″ to represent units of one foot, or ¹⁄₁₂″, ⅛″ or ¼″ (see Fig. 1) to represent units of one inch, or 0.2″, 0.24″, 0.3″, 0.4″, or 0.6″ to represent units of one foot, or 0.12″ to represent units of ¹⁄₁₀-foot. The time required to set the index line 32 to indicate a fractional reading on scale 46 for each occasion of marking, is considered well spent in view of advantages had over the use of the scale plate 33 in which the fractional markings appear along the length of its principal scale 41. The eye need not be diverted from scale 46 in seeking the division line or interpolated position thereon; then, upon clamping the instrument the fractional part contained in the given distance to be marked off, may be dismissed from the mind—leaving only the simple remainder of the given distance in whole units, to be readily found and visually retained as a graduation widely spaced from the others on principal scale 41. Furthermore, the time required for accomplishing the said setting is materially reduced with the use of the present instrument, first, in view of the free slidable arrangement between the scale plate 33 and instrument framework readily obtainable by means of the cam unit, and second, by virtue of the rapid clamping action by means of the same cam unit, which requires approximately only one-eighth of a turn to firmly secure the scale plate 33 and framework together.

A scale-plate 33 having the said fractional markings along the length of its principal scale 41, may be provided with the supplemental, fractional scale 46 as well; making possible a choice in the use of the scale-plate 33, either (a) in a fixed position on every occasion of marking requiring the use of the whole- and fractional-units of the graduations of principal scale 41, or (b) in various positions on occasions of marking requiring the use of the whole-unit graduations of principal scale 41 and the fractional-unit graduations of supplemental scale 46. The said whole-unit graduations in contra-distinction to the fractional markings of principal scale 41, stand out, since the corresponding whole-unit graduations of measuring scale 44 appear alone without fractional markings. In connection with the photo-contact-printing and staining process, glass-positives for the two types of scale-plates 33 with and without the fractional markings along the length of principal scale 41, may be made from one engraved glass negative.

The scale-plate 33 shown in Fig. 6 is designed for cartographic or other classes of precise drafting. The unit of graduation of the principal scale 41 of this particular scale-plate, is the millimeter; and the decimal scale 46 (enlarged in Fig. 17) correspondingly one millimeter in extent, is divided alternately into blocks 96 and spaces 97 each of which is 0.1 millimeter in width—making in all five blocks and five spaces. These small scale markings are made discernable by the cylindrical lens-surface magnifier 98 adapted to and held in the channel formed by the base-plate 6 and the side pieces 99, 99 extending vertically therefrom and transversely thereof. The magnifier brings the index lines 32 and 100 (the latter is referred to hereinafter) in view, and it may be slid in said channel to bring the decimal scale 46 in view at the same time, or to bring decimal scale 45 in view. The small scale markings can be reproduced with precision and clearness on a vinylite plastic surface by the photo-contact-printing and staining process.

A scale-plate 33 designed for precise drafting wherein the unit of graduation of its principal scale is one-tenth of an inch, is provided with supplemental, decimal scales 46 and 45 (shown enlarged in Fig. 16) correspondingly one-tenth of an inch in extent and divided alternately into blocks 101 and spaces 102, each of which is five-thousandths of an inch in width—making in all ten blocks and ten spaces; the right sides of the blocks as viewed in the drawing, denoting graduations one-hundredth of an inch apart.

Measuring scale 44 is used to measure the number of whole units of measure contained in a distance between two given points on a plane surface, and supplemental scale 45 is used conjunctively with said scale 44 to measure the remaining fractional or decimal part of such unit contained in the said distance. Said scales 44 and 45 serve in testing the precision of marking off a given distance, hence, also the longitudinal adjustment of the marking edge 21. A distance thus measured between two points on a drawing, photograph or on a standard metal- or glass-scale, would be transferred with precision to a drafting compilation, when the same scale-plate 33 is used in marking off the measured distance.

The index line 100 (marked with the letter "X") appears on every instrument base-plate 6; it is parallel with the index line 32 (marked with the numeral "0") is rearward thereof and at an adopted distance of one millimeter therefrom. The special graduation 103 (also marked with the letter "X") appears on all scale-plates 33, except in the case of the conventional inch-scale, it being desirable to have the fractional markings of the inch along both lengths of scales 41 and 44 in that case, and thereby also omit supplemental scales 45 and 46, as in Fig. 2. Said special graduation 103 of scale 41 is accordingly one millimeter from the zero position of said scale 41 and forward of said zero position. In view of the defined positions of the index line 100 and the special graduation 103, a distance obtaining between the marking position of the marking edge 21 and said graduation 103 is indicated as a reading on supplemental scale 46 by the index line 100.

To mark off a given distance smaller than the unit of graduation of principal scale 41, the following steps are taken: set and clamp the instrument with the index line 100 indicating the given distance as a reading on scale 46; maneuver the instrument on the drafting surface and bring the special graduation 103 in registry with a given drafting position from which the distance is to be marked off; press block 17 to bring the marking edge 21, if clear of the transverse edge 39, to contact the drafting surface. If the marking procedure is obstructed by the scale-plate portion 86 so as not to permit the marking edge 21 to contact the drafting surface, the instrument framework is held in position with one hand, while the other hand successively turns the handle bar 57 counter-clockwise to a position beyond its neutral position, moves the released scale-plate 33 from its obstructing position and then proceeds with the marking.

The parallel lines 104, 104 inscribed on the undersides 14 and 15 of base-plates 6 and 7 are successively in alignment with one another and perpendicular to the continuous side 8 of a base plate 6; their purpose being to aid in orienting the instrument directionally while marking off a distance perpendicularly from a given drafting line.

The alternate inking device shown in Figs. 11 and 12, functions as—but differs in form from—the inking device shown in other figures of the drawing and previously described herein. The vertical plate 1' and the inking strip 2' secured to the base 3' of said plate 1', may be entered in place in the instrument without flexing the inking strip 2'; the length of the top portion 4' of plate 1' being slightly less than the length of the slot 79, and the slot 80 being lengthened beyond its present termination 81 to accommodate the elongated base portion 5' slidably therein. The rectangular opening 6' extending inwardly from the inner side 7' of the medial portion 8' of the vertical plate 1', is adapted to and snugly receives the plate portion 9' beyond the rectangular opening 10' which extends inwardly from the outer end 11' of the removable horizontal plate 12'; and said opening 10' is adapted to and snugly receives the vertical-plate portion 13' beyond the opening at the same time; whereby the said plates 1' and 12' are frictionally and rigidly cross-wise combined.

After entering the vertical plate 1' in place, and then combining it with the horizontal plate 12' as described; the top elongated portion 14' of plate 1' will overlie plate 12', said plate 12' will be in resting contact with the instrument-framework top plate 1, and appropriate clearances will be had between the elongated base portion 5' and said top-plate 1 and, between the inking-strip 2' and the marking arm in depressed position.

When the alternate inking device of Figs. 11 and 12, is brought to the extreme forward limit of its longitudinal travel, the inner side 7' will contact the end 82 of slot 79, the elongated base portion 5' will contact the end 15' of said lengthened slot in the marking arm, and a clearance will be had between the marking-arm block 17 and the horizontal plate 12'. The rubber band 88 when in place is lodged at one end in the notch 16' formed in the projecting piece 17' of horizontal plate 12'.

The transverse edge 39 predeterminately may be disposed relative to the graduations of scale 41 so that a chisel-pointed pencil line, ruled immediately adjacent to said edge 39 on an applied-to drafting surface, would correspond substantially to the zero end of scale 41. In this respect, the scale plate 33 itself could be used with a pencil to mark off a given distance corresponding to a reading on scale 41, and scales 44 and 45 could be used immediately thereafter to verify the marked-off distance.

A scale-plate 33 may be of a length to accommodate scales 41 and 44 of any desired longitudinal extent, necessitating in extreme cases, widening or otherwise reinforcing a length portion of said plate 33 beyond the base plates 6 and 7.

The recession 16'' (see Fig. 6) extending from the side 9 into base plate 7 and along a length portion thereof in the way of transverse member 13 and a recession 17'' extending from the side 34 into scale plate 33 and along a length portion thereof in the way of transverse member 13, allow a clamping action (transmitted by a rotary force applied to the cam-unit) to be concentrated at the edges 18', 18' and 19', 19' and along portions of respective sides 9 and 34 adjacent to the said edges, thereby distributing said clamping action along a greater length portion of scale plate 33 and also affording greater resistance against longitudinal slippage by a partial clutch action of said edges. A more effective clutch action may be provided, for example, by additional interruptions in the continuity of the side 9 so as to leave saw-like edges in alignment with said side 9.

The inking device and the slots 79 and 80 may be dispensed with in order to reduce the cost of manufacture. In the absence of said device, an inked strip or a piece of typewriter ribbon would be kept at hand or attached to the drafting table for ink-priming the marking edge 21, the latter being pressed against said strip or ribbon prior to each occasion of marking.

The principle of the opaque background for a scale viewed through transparent material has been applied heretofore merely for the purpose of protecting the markings of a scale along a beveled edge. In the present plan, the background lies immediately adjacent to an applied-to drafting surface, and the terminals of the division lines which constitute the graduations of the scales 41, 44 and 45 lie within the bounds of the undersurface of scale plate 33, and a drafting position to which the scale is applied is viewed through the plate as well, thereby substantially eliminating any error due to refraction.

It will be obvious to those skilled in the art that various changes may be made without departing from the spirit of the invention and therefore the invention is not limited to what is shown in the drawings and described in the specification but only as indicated in the appended claims.

What is claimed is:

1. A drafting-instrument assembly for slidably embracing and clamping a length of predetermined width of scale plate laterally while said plate is resting flatwise on a drafting surface, said assembly comprising a platform, a pair of spaced, plate-like blades projecting outwardly from said platform and adapted to rest flatwise with said platform on a drafting surface and to laterally embrace and grip said scale plate while the blades and the scale plate respectively are in said flatwise, resting position, and means for adjusting the degree of lateral grip of said blades on said scale plate, said means comprising an overlying, transverse, plate-like member connecting said blades and having at least some of its part overlying the space between the blades of material possessing sufficient transparency to permit adequate vision therethrough to the scale plate when said plate is held between said blades, the connection of at least one of the blades with said transverse member including a means operable for moving said blade relative to the transverse member thereby to flex the blades laterally and vary the distance between them, said operating means included at the connection being disposed and arranged not to obstruct the space between said blades nor to hinder the viewing of said scale plate when said plate is held between the blades nor to interfere with the said flatwise, resting position of the blades and scale plate respectively.

2. The drafting-instrument assembly of claim 1 wherein the means operable for moving one of the blades relative to the transverse member is a cam unit comprising two cylindrical portions disposed to turn respectively in a bore having fixed relation to the blade and in a bore in the transverse member, the axes of said cylindrical portions being spaced, the bore in which one of the cylindrical portions is disposed to turn being oblong in a direction longitudinally of said blade and having a width substantially equal to the diameter of said cylindrical portion, said cam unit being disposed and arranged not to obstruct the space between said blades nor to hinder the viewing of said scale plate when said plate is held between the blades nor to interfere with the said flatwise, resting position of the blades and scale plate respectively.

3. The drafting-instrument assembly of claim 1 wherein the means operable for moving said one of blades relative to the transverse member is operable also for locking said blades in any adjusted position.

4. The drafting-instrument assembly of claim 1 wherein the means operable for moving said one of blades relative to the transverse member is a cam unit comprising a cylindrical portion disposed to turn in a bore having fixed relation to the blade and another cylindrical portion of different diameter disposed to turn in a bore in the transverse member, the axes of said cylindrical portions being spaced apart at a distance comparatively small with respect to the radius of the circular cross-section of the cylindrical portion having the smaller diameter, the bore in which one of the cylindrical portions is disposed to turn being oblong in a direction longitudinally of said blade and having a width substantially equal to the diameter of said cylindrical portion, said cam unit being disposed and arranged not to obstruct the space between said blades nor to hinder the viewing of said scale plate when said plate is held between said blades nor to interfere with the said flatwise, resting position of the blades and scale plate respectively.

5. The drafting-instrument assembly of claim 1 and a guide means for directionally limiting the movement of said one of blades relative to the transverse member in a direction transversally of said blade.

6. The drafting-instrument assembly of claim 1 and a marking implement supported by said platform.

7. In a marking instrument, a platform adapted to rest on the surface to be marked, said platform having a portion thereof recessed to provide an inverted channel, a resilient arm within said channel and secured at one end to said platform, a marking edge on the free other end of said resilient arm, said resilient arm being responsive to pressure and disposed to flex within said channel and bring said marking edge from a premarking to a marking position, and a thin inking plate in said channel disposed below said resilient arm and slidably held thereto to permit reciprocation of the inking plate for engagement as well as non-engagement with said marking edge when said arm is flexed toward said inking plate.

8. In a marking instrument, a platform adapted to rest on the surface to be marked, said platform having a portion thereof recessed to provide an inverted channel, a slotted resilient arm within said channel and secured at one end to said platform, a marking edge on the free other end of said resilient arm, said resilient arm being responsive to pressure and disposed to flex within said channel and bring said marking edge from pre-marking to a marking position as well as from a marking position to pre-marking position, a thin inking plate in said channel disposed below said resilient arm and slidably held thereto to permit reciprocation of the inking plate for engagement as well as nonengagement with said marking edge when said resilient arm is flexed toward said inking plate, said inking plate having an upward flange projecting therefrom and through the slot in said resilient arm to a distance above said resilient arm and means cooperating with the inking plate for limiting the amount of vertical movement of said flange in the slot of said resilient arm.

9. The elements in a marking instrument set forth in claim 8 wherein the means cooperating with the inking plate for limiting the amount of vertical movement of the flange in the slot of the resilient arm is a plate slottedly combined with said flange to permit ready removal of the flanged inking plate from said arm.

References Cited in the file of this patent

UNITED STATES PATENTS

| 346,368 | Honeycutt | July 27, 1886 |
| 837,869 | Myers | Dec. 4, 1906 |
| 930,235 | Sanders | Aug. 3, 1909 |
| 1,007,038 | Maupin | Oct. 24, 1911 |
| 1,047,426 | Mainzer | Dec. 17, 1912 |
| 1,497,492 | Engel | June 10, 1924 |
| 1,564,382 | Treiman | Dec. 8, 1925 |
| 1,745,188 | Pipirs | Jan. 28, 1930 |
| 1,751,366 | Shaub | Mar. 18, 1930 |
| 1,840,568 | Clark | Jan. 12, 1932 |
| 2,078,156 | Perry | Apr. 20, 1937 |
| 2,104,515 | Golden | Jan. 4, 1938 |
| 2,252,311 | Ware | Aug. 12, 1941 |
| 2,489,830 | Stone | Nov. 29, 1949 |
| 2,744,330 | Siems | May 8, 1956 |

FOREIGN PATENTS

| 22,910 | Great Britain | 1905 |